US011519441B2

(12) United States Patent
Liebelt et al.

(10) Patent No.: US 11,519,441 B2
(45) Date of Patent: Dec. 6, 2022

(54) TREE FASTENER REMOVAL ASSEMBLIES AND METHODS THEREFOR

(71) Applicant: ILLINOIS TOOL WORKS INC., Glenview, IL (US)

(72) Inventors: Scott M. Liebelt, Eau Claire, WI (US); Sean A. Tomaselli, West Bloomfield, MI (US)

(73) Assignee: Illinois Tool Works Inc., Glenview, IL (US)

( * ) Notice: Subject to any disclaimer, the term of this patent is extended or adjusted under 35 U.S.C. 154(b) by 304 days.

(21) Appl. No.: 16/734,052

(22) Filed: Jan. 3, 2020

(65) Prior Publication Data
US 2020/0224697 A1     Jul. 16, 2020

Related U.S. Application Data

(60) Provisional application No. 62/790,711, filed on Jan. 10, 2019.

(51) Int. Cl.
*F16B 19/00* (2006.01)
*F16B 21/08* (2006.01)
*F16B 37/14* (2006.01)

(52) U.S. Cl.
CPC .......... *F16B 19/004* (2013.01); *F16B 21/084* (2013.01); *F16B 37/14* (2013.01); *F16B 19/00* (2013.01)

(58) Field of Classification Search
CPC .... F16B 19/004; F16B 21/084; F16B 21/086; F16B 37/14; F16B 19/00; Y10S 411/913; Y10S 411/999

USPC .......... 411/372.5, 372.6, 373, 508, 509, 510, 411/913, 999
See application file for complete search history.

(56) References Cited

U.S. PATENT DOCUMENTS

| | | | |
|---|---|---|---|
| 3,141,209 A | 7/1964 | Van Buren, Jr. | |
| 3,588,792 A * | 6/1971 | Bushey et al. | H01R 9/16 206/820 |
| 4,100,368 A | 7/1978 | Thomsen | |
| D268,006 S | 2/1983 | Wollar | |
| 4,396,329 A * | 8/1983 | Wollar | F16B 21/084 411/452 |
| D298,736 S | 11/1988 | Shiraishi | |
| D298,801 S | 12/1988 | Satoh | |
| 4,840,523 A | 6/1989 | Oshida | |
| 4,936,530 A * | 6/1990 | Wollar | F16B 13/02 248/68.1 |
| 5,306,098 A | 4/1994 | Lewis | |
| 5,368,261 A | 11/1994 | Caveney et al. | |
| 5,653,564 A * | 8/1997 | Nakamura | F16B 37/14 411/373 |
| 5,695,307 A | 12/1997 | Takahashi | |
| 5,907,891 A | 6/1999 | Meyer | |

(Continued)

FOREIGN PATENT DOCUMENTS

| | | |
|---|---|---|
| CH | 189926 A | 3/1937 |
| CN | 1682036 A | 10/2005 |

(Continued)

*Primary Examiner* — Roberta S Delisle
(74) *Attorney, Agent, or Firm* — Quarles & Brady LLP (57) ABSTRACT

A tree fastener assembly includes a cap, a base, a strap that connects the cap with the base, and a stem that extends from the base. A plurality of first wings extend radially outward from the stem.

20 Claims, 8 Drawing Sheets

(56) References Cited

U.S. PATENT DOCUMENTS

| | | | |
|---|---|---|---|
| 6,264,413 B1 * | 7/2001 | Bisping | F16B 13/04 411/41 |
| 6,287,064 B1 | 9/2001 | Jhumra et al. | |
| 6,381,806 B1 * | 5/2002 | Stanesic | B60N 3/046 16/6 |
| 6,431,585 B1 * | 8/2002 | Rickabus | B60R 21/216 280/730.2 |
| 6,669,426 B1 * | 12/2003 | Detter | F16B 19/004 411/908 |
| 6,719,513 B1 | 4/2004 | Moutousis et al. | |
| 6,799,931 B2 | 10/2004 | Kwilosz | |
| 7,338,068 B2 * | 3/2008 | Kawai | B60R 21/215 24/297 |
| 7,503,528 B2 | 3/2009 | Adams et al. | |
| 7,862,272 B2 | 1/2011 | Nakajima | |
| 7,931,430 B2 * | 4/2011 | Thrift | F16B 39/103 411/129 |
| 8,028,962 B2 | 10/2011 | Geiger | |
| 8,316,514 B2 * | 11/2012 | Sano | B60R 13/02 24/297 |
| 8,601,649 B2 | 12/2013 | Klein et al. | |
| D778,715 S | 2/2017 | Deachin et al. | |
| 9,669,770 B1 | 6/2017 | Schlaupitz et al. | |
| 9,828,151 B2 | 11/2017 | Aoyama | |
| 9,862,422 B2 | 1/2018 | Jarvis et al. | |
| 10,462,910 B2 | 10/2019 | Brodbeck et al. | |
| D891,235 S * | 7/2020 | Liebelt | D8/382 |
| 2003/0231943 A1 | 12/2003 | Detter et al. | |
| 2005/0100425 A1 * | 5/2005 | Wu | F16B 37/14 411/372.5 |
| 2006/0239796 A1 | 10/2006 | Franks | |
| 2008/0226415 A1 * | 9/2008 | Thrift | F16B 39/103 411/121 |
| 2012/0217355 A1 | 8/2012 | Geiger et al. | |
| 2013/0119208 A1 | 5/2013 | Geiger | |
| 2015/0219136 A1 | 8/2015 | Koelling | |
| 2016/0223100 A1 | 8/2016 | Geiger | |

FOREIGN PATENT DOCUMENTS

| | | |
|---|---|---|
| CN | 201228705 Y | 4/2009 |
| CN | 201679815 U | 12/2010 |
| GB | 414513 A | 8/1934 |
| WO | 2018212939 A1 | 11/2018 |

* cited by examiner

FIG. 1

PRIOR ART

TREE FASTENER REMOVAL ASSEMBLIES AND METHODS THEREFOR

CROSS-REFERENCES TO RELATED APPLICATIONS

The present application is based on and claims priority to U.S. Provisional Patent Application No. 62/790,711, filed on Jan. 10, 2019. The entire disclosure of which is incorporated herein by reference in its entirety.

FIELD OF EMBODIMENTS OF THE DISCLOSURE

The present disclosure relates to a tree-type fastener, which includes a tethered strap that couples a cap of the fastener with a base thereof.

BACKGROUND

Fasteners may be used to secure components together. Xmas Tree Clips, i.e., Christmas Tree Fasteners or X-mas Trees, comprise a type of fastener that is often used to secure trim or other softer materials to a surface of a rigid object. Tree fasteners may be single or double ended, and typically include a rounded head from which a stem extends. Such fasteners may also include a plurality of fins or wings that extend outward from the stem in an annular configuration. In operation, the fastener is configured to be driven through an aperture of the rigid object, the fins or wings being designed to engage a peripheral edge of the aperture to secure the tree fastener within the rigid object. The configuration of the fins or wings allows for the fastener to be securable to a wide range of materials having varying densities or thicknesses. Tree fasteners can be removable or non-removable. Further, tree fasteners may include a drive feature (e.g. a socket, a slot, or similar) configured to accept the working end of a driving tool, thus providing a user with the means to install the fastener within an aperture using the driving tool.

Tree fasteners are typically manufactured as single, stand-alone pieces. As a result, additional, related fasteners or hardware are typically provided separately. In one particular application, tree fasteners are used in an automotive application, for instance, with brackets or wire channel routing. In those situations, the tree fasteners are often provided in combination with the additional hardware, but are not been provided with any type of retention mechanism that allows for the tree fastener to be retained during shipment thereof.

In many circumstances, components of the tree fastener assembly may be lost or misplaced due to the components being provided in a loose configuration with one another. In light of the above, a need exists for an improved tree fastener assembly wherein various components of the tree fastener assembly are affixed or tethered to one another. Such an improved tree fastener assembly may increase installation efficiency by reducing the amount of time a user might otherwise spend searching for lost or misplaced components.

SUMMARY

Embodiments of the present disclosure generally relate to a tree fastener assembly comprising a cap, a base, a strap that connects the cap with the base, and a stem that extends from the base. A plurality of first wings and a plurality of second wings extend outward from the stem, the plurality of first wings being offset longitudinally from the plurality of second wings.

In operation, the tree fastener assembly is configured to secure one or more soft materials to the exterior of the rigid object. The stem of the tree fastener is designed to be driven through an aperture on the rigid object, such that the first and second wings abut against an interior surface of the rigid object and prevent the fastening assembly from being expelled from the aperture. The base of the fastener abuts against an exterior surface of the rigid object and a rim extends upward from the base. The strap, which tethers the base to the cap, extends outwardly from the base. The cap is configured to secure to the rim via locking features.

When fastening a soft material to the rigid object, an aperture within the soft material is passed over the rim, the strap is extended around a peripheral edge of the soft material, and the cap is secured to the rim via the locking features. As such, the soft material is secured between the cap and the base, thereby fastening the soft material to the rigid object.

In some embodiments, the tree fastener assembly is fastened to the soft material prior to being fastened to the rigid object. In other embodiments, the tree fastener assembly is secured to the rigid object prior to being subsequently fastened to the soft material.

In some embodiments, the tree fastener assembly may include a drive feature upon the base, the drive feature being configured to accept the working end of a driving tool (e.g. a screwdriver, a hex key, or otherwise), such that a user may use a driving tool to advance the fastener assembly through the aperture of the rigid object. The drive feature may comprise a slot, an aperture, a socket, an indentation, a polygonal protrusion, or any other structure designed to interface with the working end of a driving tool.

In one particular embodiment, a tree fastener assembly comprises a cap, a base, a strap that connects the cap with the base, and a stem that extends from the base. A plurality of wings extend radially outward from the stem. It is also contemplated that the cap, the strap, the base, and the stem may be integrally formed. Further, the plurality of wings may include a plurality of first wings and a plurality of second wings, such that the plurality of first wings are offset longitudinally from the plurality of second wings. Still further, the cap may be securable to the base via one or more locking features that extend from at least one of the cap or base. The one or more locking features may include a first locking feature comprising at least one arm that depends from a first surface of the cap. The one or more locking features may also include a second locking feature that comprises an annular rim that extends upward from a second surface of the base, the annular rim being configured to engage with the at least one arm. The at least one arm may include a plurality of first arms that are separated by a plurality of spaces. Also, the annular rim may include one or more gaps or spaces configured to allow one of the plurality of first arms to be accessed by a tool to effectuate disengagement of the cap from the base when the tree fastener assembly is in a locked configuration.

In a different embodiment, a unitary tree fastener assembly comprises a cap, a base, a strap that connects the cap with the base, a stem that extends from the base, and a plurality of wings that extend radially outward from the stem. The unitary tree fastener is movable between an unlocked configuration such that the cap is disposed at a first distance from the base, and a locked configuration such that the cap is disposed at a second distance from the base. The first distance is greater than the second distance.

It is also contemplated that the plurality of wings comprise a plurality of first wings and a plurality of second wings, the plurality of first wings being offset longitudinally from the plurality of second wings. Further, the cap may be removably secured to the base via at least one locking feature when the unitary tree fastener is in the locked configuration. The at least one locking feature may include at least one first arm that depends from the cap and an annular rim that depends from the base, the at least one first arm being configured to engage with the annular rim when the unitary tree fastener is in the locked configuration. Additionally, the at least one first arm may comprise a plurality of first arms that depend from a lower surface of the cap, the plurality of first arms being disposed in a radial configuration and being separated by a plurality of spaces. The cap may also include a central hole extending axially therethrough, the plurality of first arms being radially disposed about the central hole, wherein the annular rim of the base is configured to extend axially through the central hole when the unitary tree fastener is moved into the locked configuration. It is further contemplated that the annular rim of the base may define a periphery of a recessed area, and a drive feature may be disposed within the recessed area, the drive feature being configured to interface with a working end of a driving tool.

In yet another embodiment, a fastener assembly for fastening at least one material to an exterior surface of a first object is provided, wherein the at least one material includes an aperture, and the exterior surface of the first object includes a bore. The fastener includes a cap having a first locking feature, a base having a second locking feature, a strap connecting the cap with the base, a stem extending from the base, and a plurality of wings extending radially outward from the stem. The fastener assembly is movable between an unlocked configuration, such that the first locking feature is not engaged with the second locking feature, and a locked configuration, such that the first locking feature is engaged with the second locking feature.

It is also contemplated that the base, the strap, and the stem may be integrally formed. Further, the second locking feature may include an annular rim that extends axially upward from a top surface of the base. Still further, when the fastener assembly is in the unlocked configuration, the aperture of the at least one material may be configured to pass over the annular rim of the base, such that subsequently moving the fastener assembly from the unlocked configuration to the locked configuration secures the at least one material between the cap and the base. Additionally, the annular rim may define a periphery of a recessed area, the recessed area including a drive feature therein, the drive feature being configured to engage with a driving tool, such that the driving tool may be used to install the fastener assembly within the bore of the first object.

DETAILED DESCRIPTION

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Throughout the disclosure, the terms "about" and "approximately" mean plus or minus 5% of the number that each term precedes.

Embodiments of the present disclosure provide for a tree fastener assembly that includes a cap, a base from which a tree portion extends, and a tether strap that connects the cap with the base. The features described herein allow the tree fastener assembly to remain coupled with an object during transport or assembly thereof. While the disclosure hereinafter below specifically refers to a tree fastener having offset wing portions along opposing sides of the stem, it is contemplated that alternative types of tree fastener configurations may be implemented.

Figure 1:
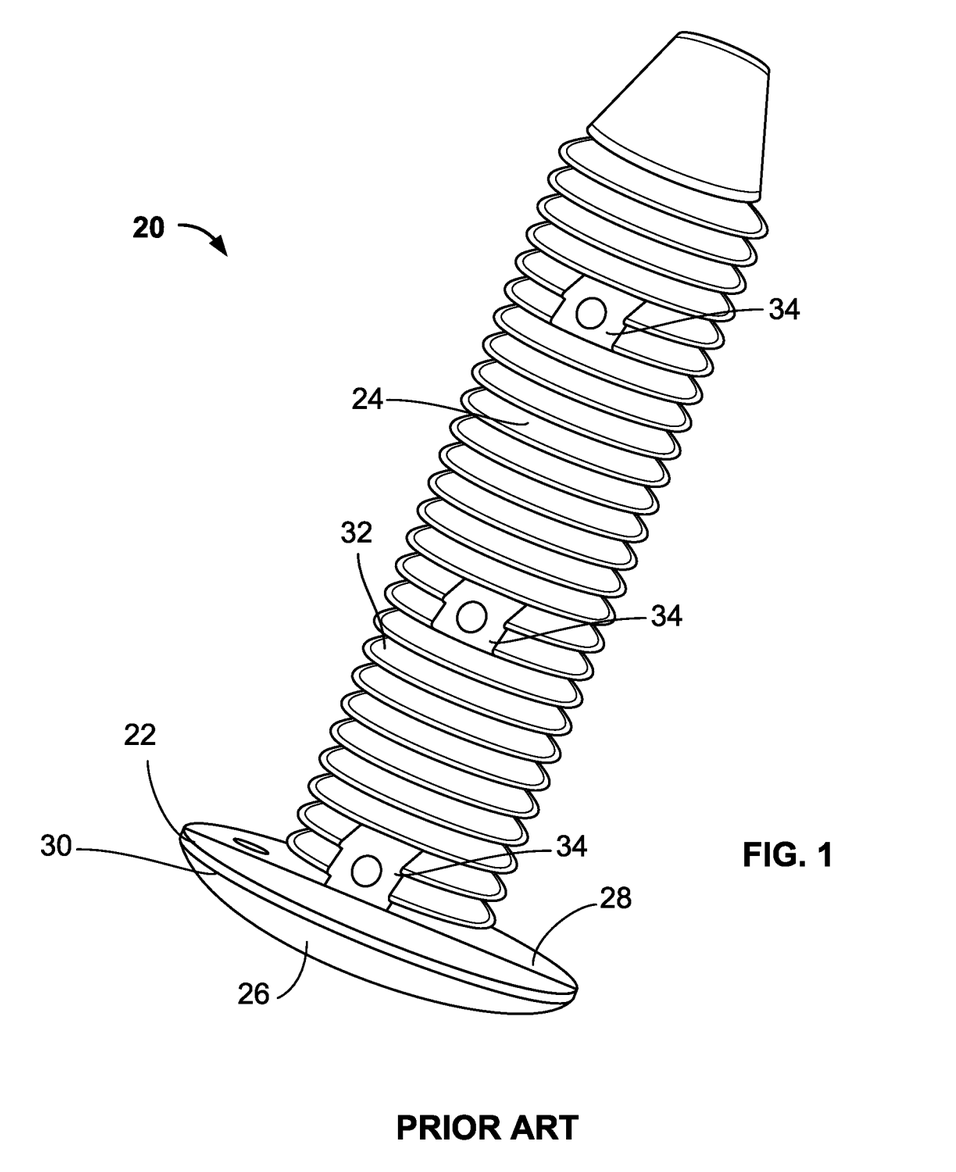
FIG. 1 is a perspective view of a prior art tree fastener.

FIG. 1 illustrates a known tree fastener 20 that includes a head 22 and a stem 24 that extends outward from the head 22. The head 22 is generally round with a slightly protruding convex upper surface 26 and a generally planar lower surface 28 that joints the upper surface 26 at a side 30 of the head 22. The stem 24 extends longitudinally from the lower surface 28 of the head 22. The stem 24 includes a series of wings 32 provided along a length of the stem 24, which extend radially outward and are generally circular in shape. Some of the wings 32 have interrupted portions, where indentations 34 are provided within portions of the wings 32. The tree fastener 20 of FIG. 1 is merely provided for illustrative purposes, and portions of the tree fastener 20 may be utilized or incorporated into the tethered fastener assembly described hereinafter below.

FIGS. 2-7 illustrate a fastener or tree fastener assembly 40 in accordance with a first embodiment of the present disclosure, and FIGS. 8-12 illustrate a fastener or tree fastener assembly 40' in accordance with a second embodiment of the present disclosure. Referring specifically to FIGS. 2, 3, 8 and 9, the fastener assemblies 40, 40' are shown coupled with a material 42, which is provided for environmental purposes.

In certain embodiments, the fastener assembly 40, 40' includes a cap 44, a tethered strap 46 extending from the cap 44, a base 48, and a stem 50 extending from the base 48. The cap 44 is directly connected to the base 48 via the strap 46.

In the first embodiment shown in FIGS. 2-7, the cap 44 is generally circular in nature and includes an upper surface 52, which is generally smooth or optionally convex, and a side surface 54 that extends about a peripheral edge of the cap 44. In some embodiments, the strap 46 is integrally coupled with the side surface 54 of the cap 44 and extends outward therefrom. In other embodiments the strap 46 may be integrally coupled to one or more of the side surface 54, the lower surface 28, the upper surface 52, or combinations thereof. The strap 46 includes generally lateral upper and lower portions 56, 58, which are connected via a curved portion 60.

Figure 4:
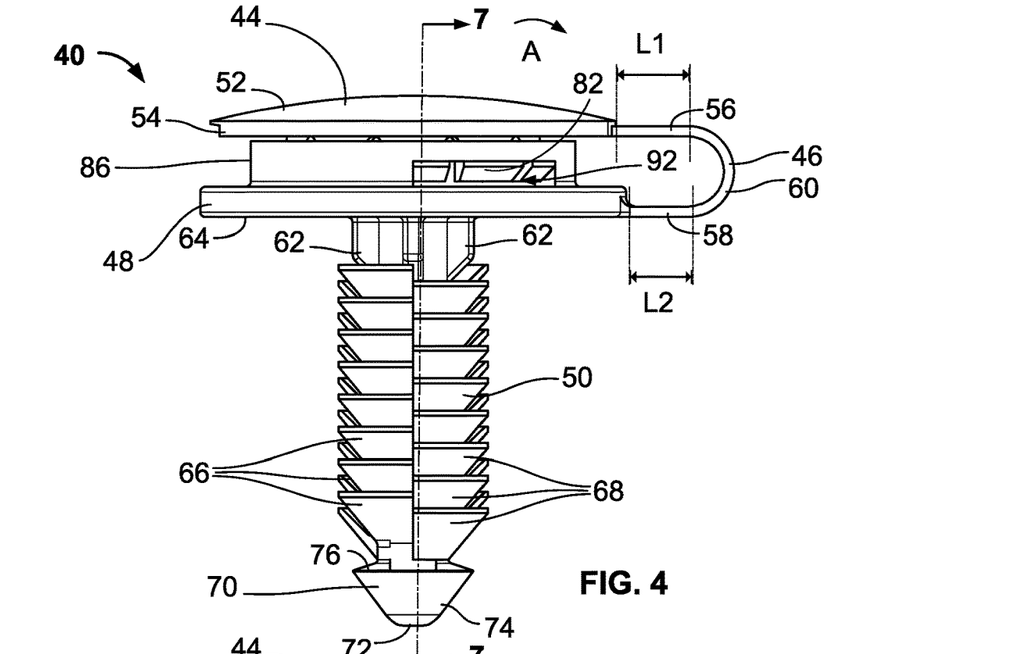
FIG. 4 is a side elevational view of the fastener assembly of FIG. 2.
Figure 5:
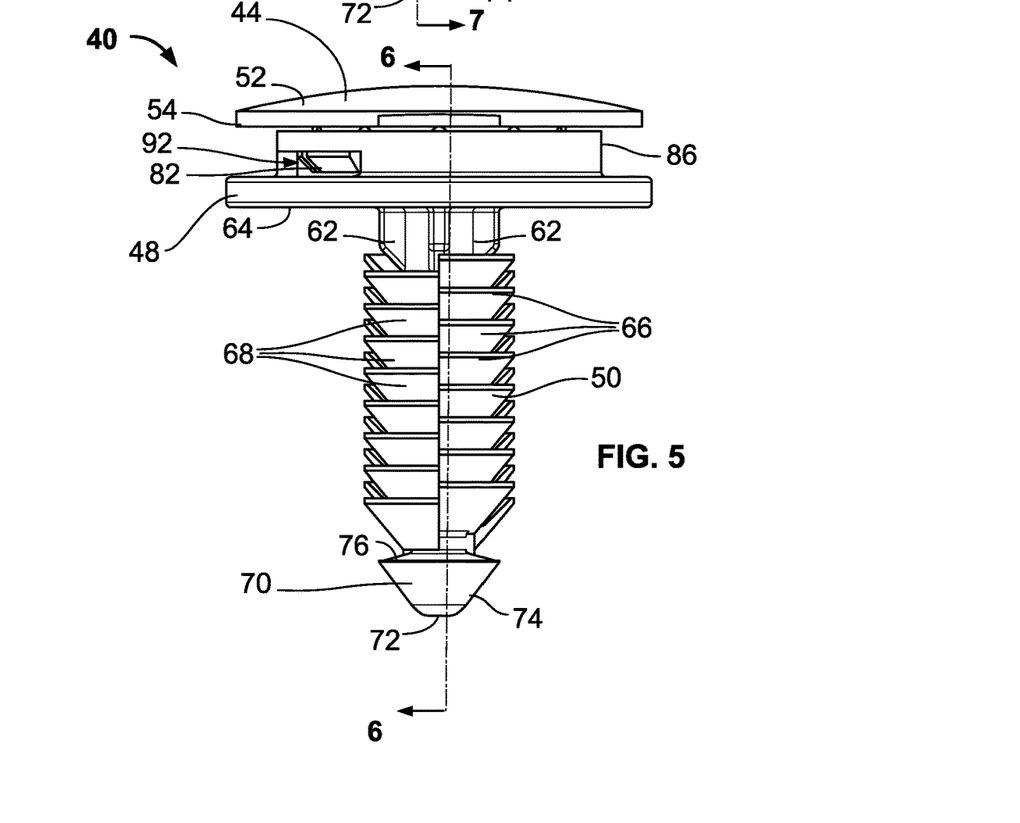
FIG. 5 is a front elevational view of the fastener assembly of FIG. 2.

Referring to FIG. 4, the upper lateral portion 56 of the strap 46 has a length L1 and the lower lateral portion 58 of the strap has a length L2. The length L1 of the upper lateral portion 56 of the strap 46 is greater than the length L2 of the lower lateral portion 58 of the strap 46. However, in some embodiments, the lengths L1 and L2 may be the same or substantially the same. In some embodiments, the length L2 may be greater than the length L1. Depending on the specific application of the fastener assembly 40, the lengths L1, L2 of the lateral portions 56, 58 of the strap 46 may be modified. The curved portion 60 of the strap 46 is generally formed to connect the lateral portions 56, 58 of the strap. In some embodiments, the curved portion 60 of the strap 46 may also act as a spring, which may allow the cap 44 of the fastener assembly 40 to spring open in a direction of arrow A when the cap 44 is removed from the base 48 of the fastener assembly 40.

Referring to FIGS. 4-7 and 8-12, the stem 50 of the fastener assembly 40 is shown more clearly. A plurality of flanges 62 extend outward from the stem 50, the plurality of flanges 62 also being directly coupled with a lower surface 64 of the base 48. The plurality of flanges 62 extend radially outward from the stem 50 where the stem 50 intersects the base 48. A plurality of first wings 66 and a plurality of second wings 68 are shown extending outward from the stem 50. The plurality of first wings 66 are offset from the plurality of second wings 68, thereby creating an offset tree structure. The plurality of first wings 66 are disposed closer to the flanges 62 than the plurality of second wings 68. As noted with the tree fastener 20 of FIG. 1 above, a number of tree configurations are possible; however, a number of advantages are realized through the use of an offset tree structure. For example, tree fasteners having offset wings may exhibit improved retention strength relative to non-offset tree fasteners because offsetting the first wings 66 from the second wings 68 permits a greater number of wings 66, 68 to be axially disposed along the stem 50. Further, offsetting the first wings 66 from the second wings 68 reduces the axial spacing found between vertically adjacent rows of wings; thus, the offset tree fastener assembly 40 may be better able to accommodate and retain the material 42 that may exhibit slight variations in thickness due to tolerances innate within the manufacturing process of material 42.

Figure 2:
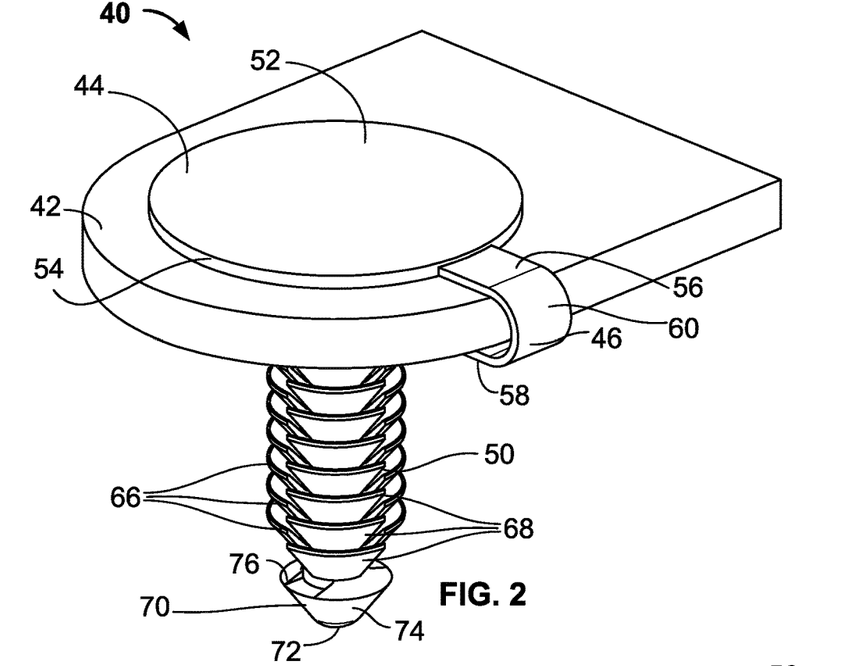
FIG. 2 is a top perspective view of a tethered tree fastener assembly securely fastened within an aperture of a piece of material, according to a first embodiment of the present disclosure.
Figure 3:
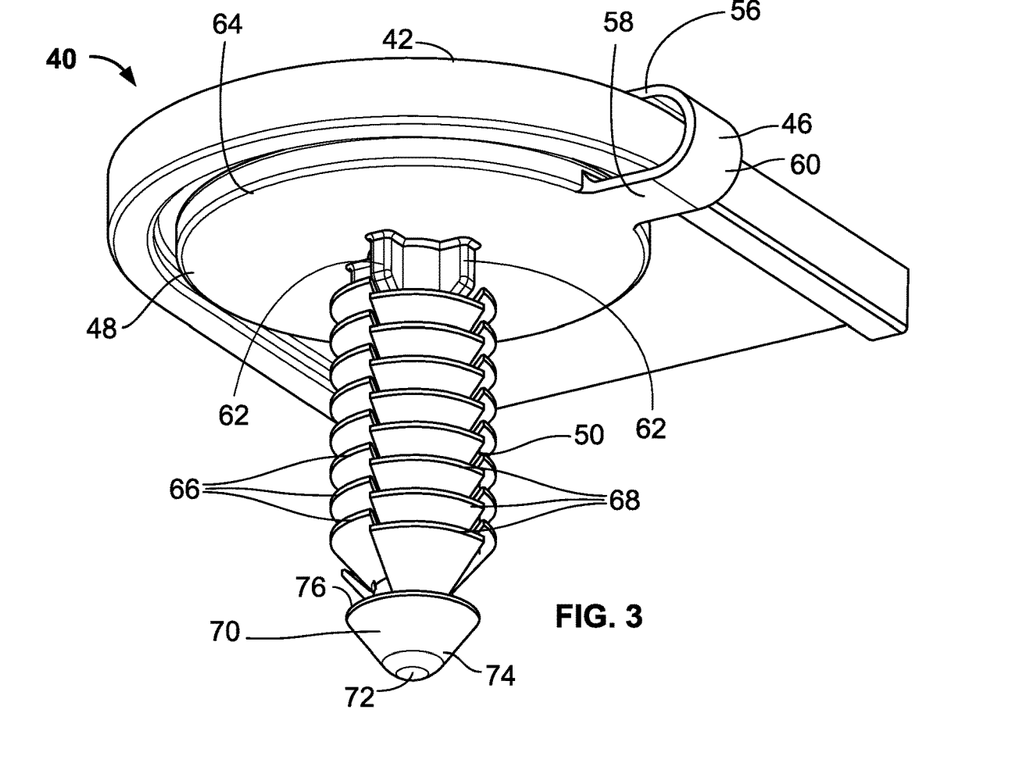
FIG. 3 is a bottom perspective view of the fastener assembly of FIG. 2.
Figure 8:
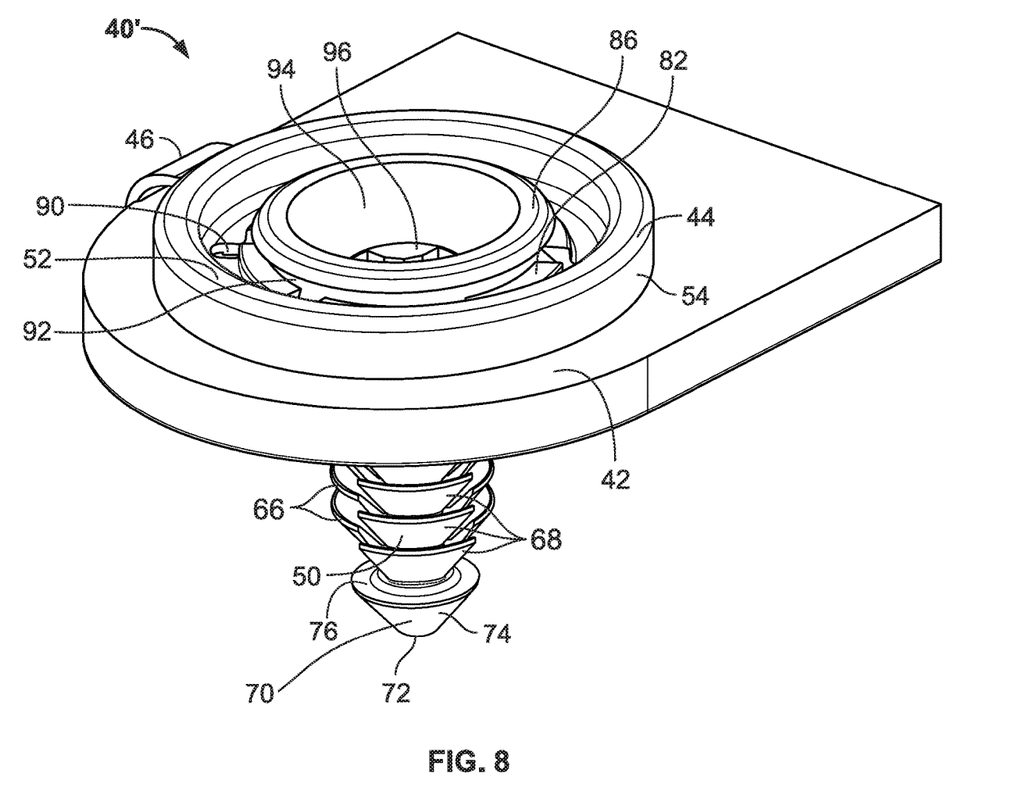
FIG. 8 is a top perspective view of a tethered tree fastener assembly securely fastened within an aperture of a piece of material, according to a second embodiment of the present disclosure.

Referring to FIGS. 2, 3, and 8, two sets of each of the plurality of first wings 66 and the plurality of second wings 68 are provided, the sets being disposed on opposing sides of the stem 50. As a result, four separate groups of wings extend from the stem 50.

Figure 10:
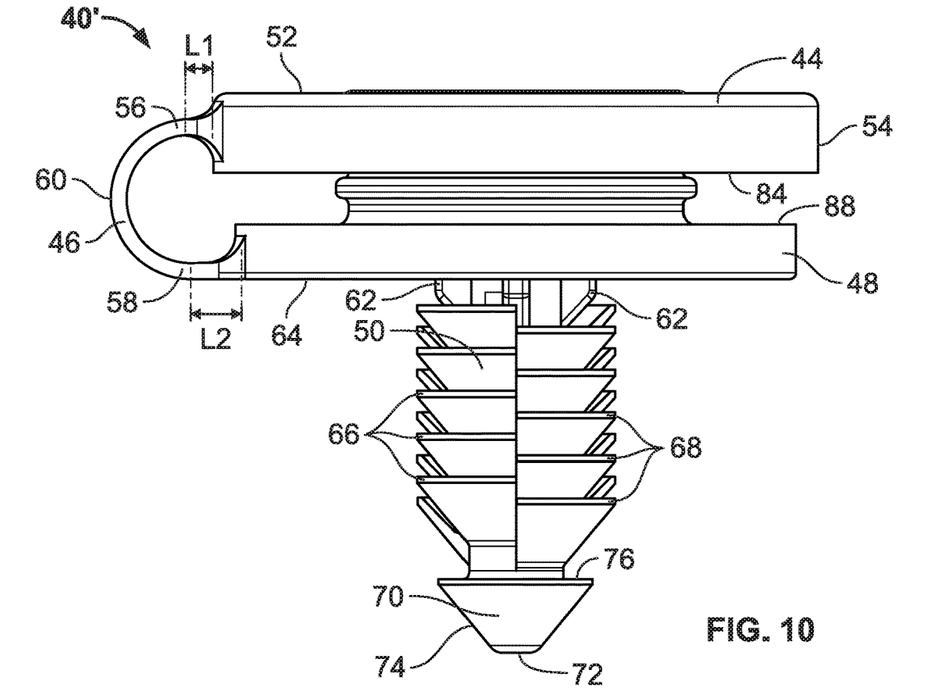
FIG. 10 is a side elevational view of the fastener assembly of FIG. 8.

Referring specifically to FIGS. 4 and 10, the tree fastener assembly 40, 40' may include stems 50 having a different length than presently shown. Similarly, embodiments of tree fastener assembly may include more or fewer wings 66, 68 disposed axially along the length of the stem 50. Accordingly, it is to be understood that a wide variety of stem lengths or wing configurations may be employed while still remaining in accordance with the present disclosure.

Referring to FIGS. 4, 5, 10 and 11, a head 70 of the stem 50 is shown. The head 70 extends outward from a distal end of the stem 50. The head 70 has a tip 72 that is generally rounded but may be generally planar, and a head surface 74 that is generally angled away from the tip 72. The head surface 74 terminates at a top surface 76 of the head 70, which extends inward toward the stem 50. The head 70 may be provided in a number of alternative configurations, and may include additional features not specifically disclosed herein.

Figure 6:
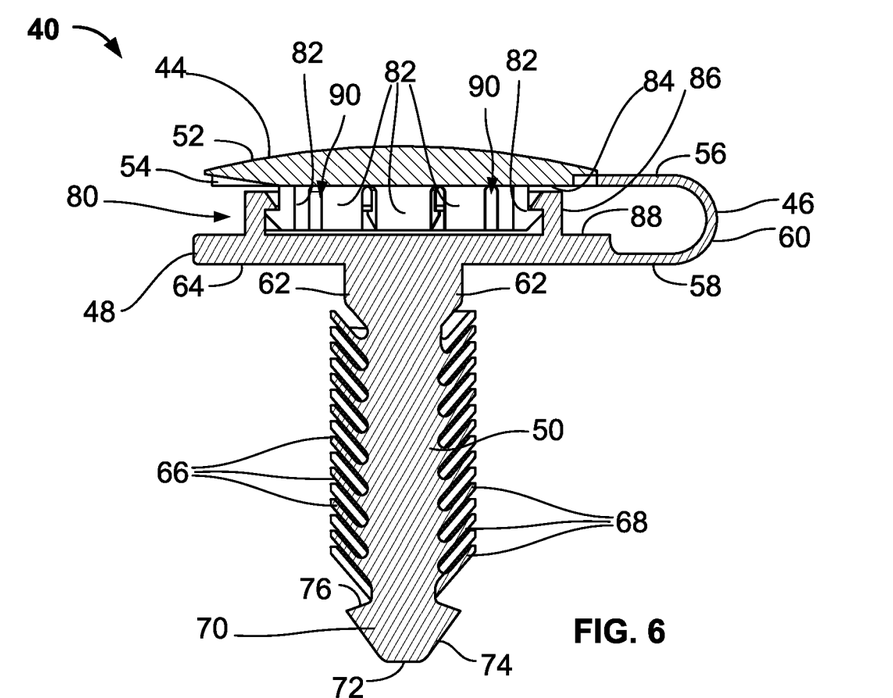
FIG. 6 is a side cross-sectional view of the fastener assembly taken through line 6-6 of FIG. 5.
Figure 7:
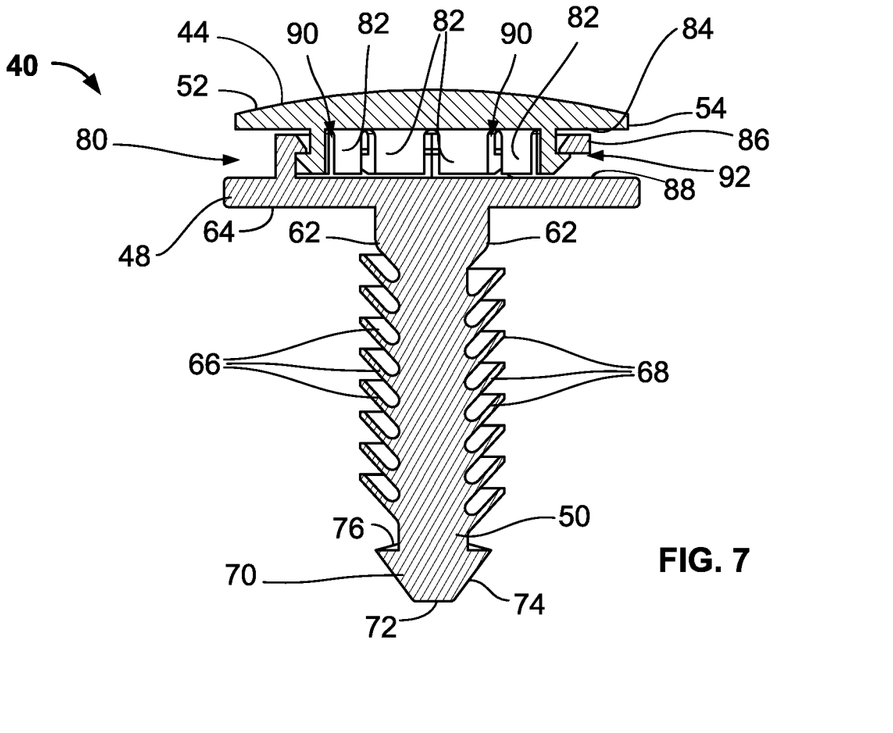
FIG. 7 is a front cross-sectional view of the fastener assembly taken through line 7-7 of FIG. 4.

Referring to FIGS. 6 and 7, cross-sectional views of the fastener assembly 40 are shown. The cap 44 is shown as a separate component than the strap 46 and the base 48, which are shown as integral components. In a preferred embodiment, the cap 44, the strap 46, the base 48, the head 70, and the stem 50 are a single, integral component, which may allow for efficiencies to be achieved during the manufacturing or molding process. In instances where the fastener assembly 40 is a single, integral component, manufacturing tooling can be optimized, and manufacturing time and cost may be reduced. However, in the illustrated embodiments, the cap 44 is one component, and the strap 46, the base 48, the stem 50, and the head 70 are another component, which is coupled with the cap 44. The cap 44 and the base 48 of the fastener assembly 40 are shown in a locked configuration.

Still referring to FIGS. 6 and 7, the locked configuration is achieved by coupling the cap 44 and the base 48 together via locking features 80. The locking features 80 may be securable via a snap fit, an interference fit, a crimp, a shrink fit, a ramp, or any other mechanical fit. In the illustrated embodiment, the locking features 80 include a plurality of first arms 82 that depend from a lower surface 84 of the cap 44 and an annular rim 86 that extends upward from a top side 88 of the base 48. A plurality of spaces 90 are provided between the plurality of first arms 82, which may allow for increased flexibility and retention of the first arms 82 with the rim 86. As noted above, a variety of locking features are contemplated. Referring again to FIGS. 4 and 5, gaps 92 are provided within the rim 86, which may be provided to allow one of the first arms 82 to be accessed by a tool of a user to effectuate disengagement of the cap 44 from the base 48. For example, a head of a flathead screwdriver may be inserted into one or more of the gaps 92 to disengage one of the first arms 82 from the rim 86.

In the second embodiment shown in FIGS. 8-12, the fastener assembly 40' includes a cap 44 that is generally disc shaped, a base 48, and a strap 46 that connects the cap with the base. In some embodiments, the cap 44, the base 48, and the strap 46 are integrally formed. The cap 44 includes an upper surface 52, a lower surface 84, and a central hole 93 that extends axially through the upper and lower surfaces 52, 84. The base 48 includes a stem 50, which extends downward from a lower surface 64 of the base 48, and a plurality of first wings 66 and a plurality of second wings 68 are shown to extend outward from the stem 50. In some embodiments, the plurality of first wings 66 may be longitudinally offset from the plurality of second wings 68. A plurality of flanges 62 are also shown to extend from the lower surface of the base 48.

Figure 9:
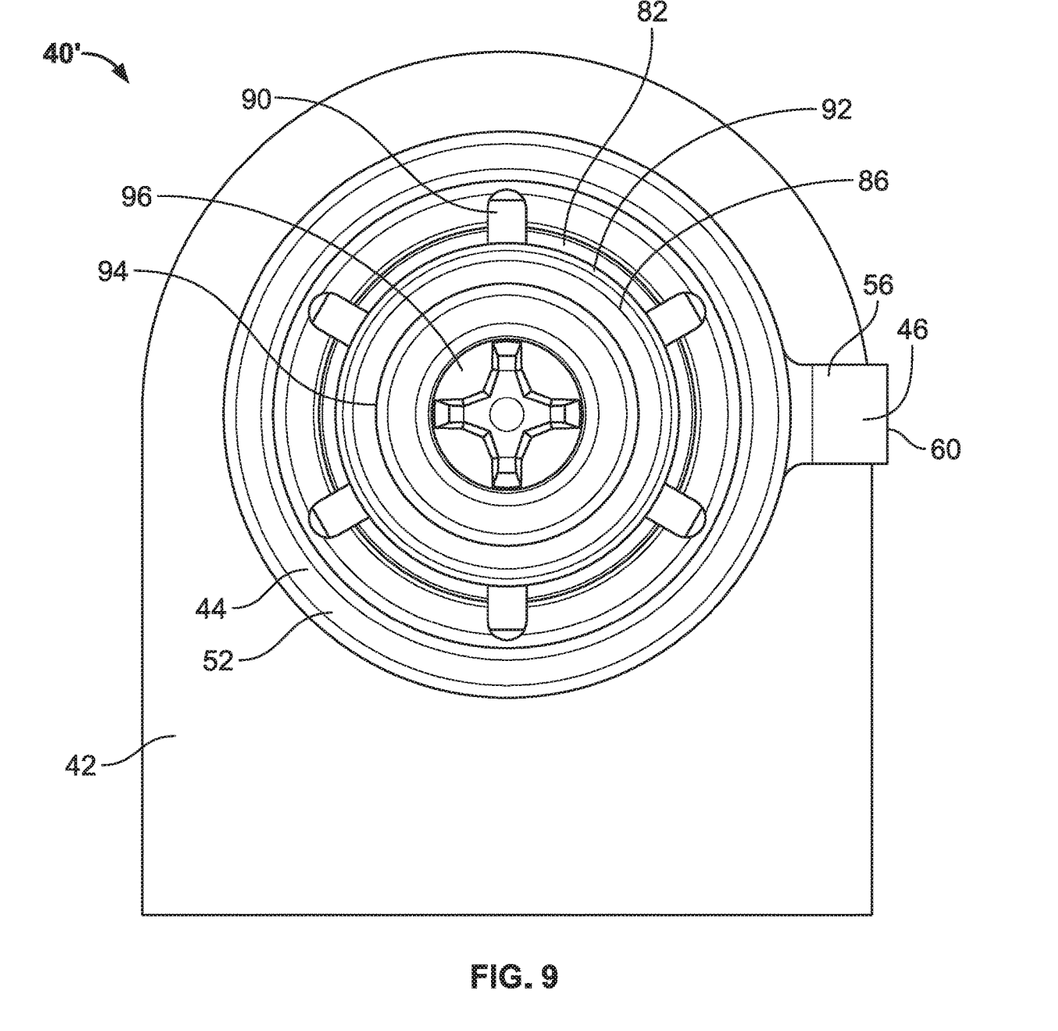
FIG. 9 is a top elevational view of the fastener assembly of FIG. 8.
Figure 11:
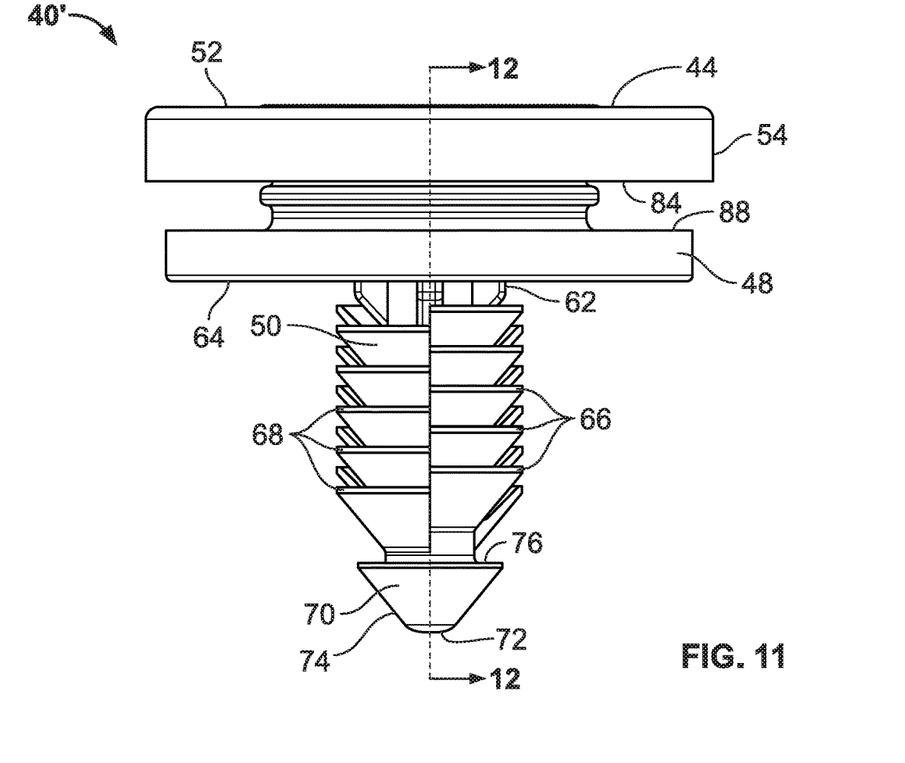
FIG. 11 is a front elevational view of the fastener assembly of FIG. 8.
Figure 12:
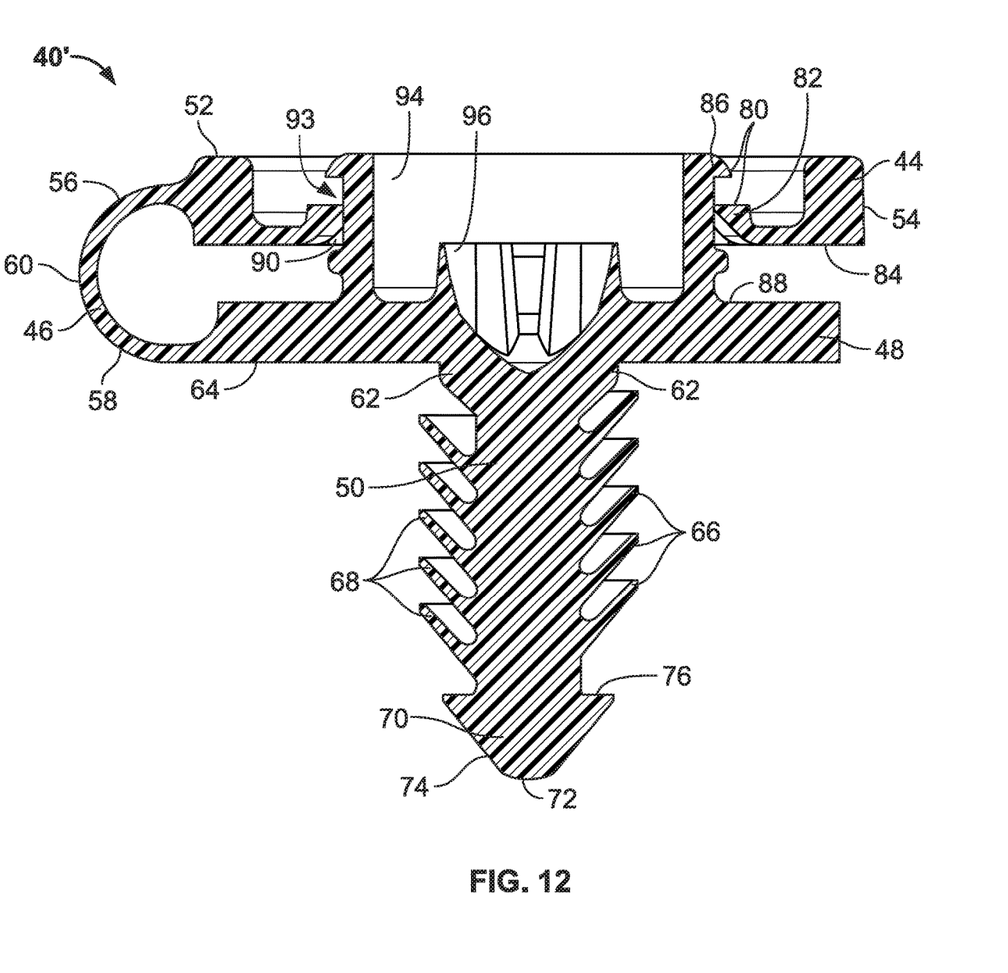
FIG. 12 is a side cross-sectional view of the fastener assembly taken through line 12-12 of FIG. 11.

Referring to FIGS. 10-12, the cap 44 and the base 48 of the fastener assembly 40' are shown in a locked configuration, wherein the cap 44 is coupled to the base 48 via locking features 80. The locking features 80 may be securable via a snap fit, an interference fit, a crimp, a shrink fit, a ramp, or any other mechanical fit. Referring specifically to FIG. 12, the locking features 80 comprise a plurality of first arms 82, which depend from the lower surface 84 of the cap 44 and extend inward towards the central hole 93, and an annular rim 86 that extends upward from a top side 88 of the base 48. To place the fastener assembly into the locked configuration, a user first positions the cap 44 above the base so that the central hole 93 is coaxially aligned with the annular rim 86. Next, the user applies a downward pressure to the cap 44 so that the annular rim 86 extends past the plurality of first arms 82 and through the central hole 93. Referring to FIGS. 9 and 12, a plurality of spaces 90 are provided between the plurality of first arms 82. The plurality of spaces 90 provide increased flexibility of the first arms 82 so that the first arms 82 may deflect and be retained within the annular rim 86. The plurality of spaces 90 may also allow one of the first arms 82 to be accessed by a tool to effectuate disengagement of the cap 44 from the base 48.

Referring again to FIGS. 8-12, the base 48 includes a recessed area 94 defined by an inner periphery of the annular rim 86. In some embodiments of the present invention, a drive feature 96 may be disposed within the recessed area 94. The drive feature 96 is configured to accept and engage with a driving tool to facilitate the installation of the fastener assembly 40 within a threaded bore. In such an application, a user would axially align the stem 50 of the tree fastener assembly 40 with the threaded bore, place a working end of a driving tool within the drive feature 96, and then actuate the driving tool such that the plurality of first and second wings 66, 68 engage with the threaded bore. The illustrated environment displays a drive feature 96 configured to engage with a Phillips head screwdriver; however, many configurations of the drive feature 96 are considered. For example, the drive feature 96 might comprise a slot, a cross slot, an aperture, a socket, an indentation, a polygonal protrusion, or any other feature configured to engage with a working end of a suitable driving tool. Some examples of suitable driving tools might include screwdrivers having any drive configuration, wrenches having any socket configuration, a hammer, or a mallet.

The embodiments illustrated herein display the cap 44 as being generally disc-shaped and the base 48 as being generally cylindrical; however, it is to be understood that alternative geometries of the cap 44 or the base 48 may be employed, for aesthetic reasons or otherwise, while still remaining in accordance with the present invention.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

We claim:

1. A tree fastener assembly, comprising:
   a cap having a first locking feature including at least one arm;
   a base having a second locking feature including an annular rim disposed around a drive feature;
   a strap that connects the cap with the base; and
   a stem that extends from the base,
   wherein a plurality of offset wings extend radially outward from the stem,
   wherein the drive feature is configured to accept and engage with a driving tool, and
   wherein the first locking feature is configured to be positioned around the annular rim.

2. The tree fastener assembly of claim 1, wherein the cap, the strap, the base, and the stem are integrally formed.

3. The tree fastener assembly of claim 1, wherein the plurality of offset wings includes a plurality of first wings and a plurality of second wings, such that the plurality of first wings are offset longitudinally from the plurality of second wings.

4. The tree fastener assembly of claim 3, wherein the cap is securable to the base via the first locking feature that extends from the cap.

5. The tree fastener assembly of claim 4, wherein the at least one arm depends from a first surface of the cap.

6. The tree fastener assembly of claim 5, wherein the annular rim extends upward from a second surface of the base, the annular rim being configured to engage with the at least one arm.

7. The tree fastener assembly of claim 6, wherein the at least one arm comprises a plurality of first arms that are separated by a plurality of spaces.

8. The tree fastener assembly of claim 7, wherein the plurality of spaces are configured to allow one of the plurality of first arms to be accessed by a tool to effectuate disengagement of the cap from the base when the tree fastener assembly is in a locked configuration.

9. A unitary tree fastener, comprising:
   a cap having a central hole extending therethrough;
   a base having an annular rim;
   a strap that connects the cap with the base;
   a stem that extends from the base; and
   a plurality of wings that extend radially outward from the stem,
   wherein the unitary tree fastener is movable between an unlocked configuration, such that the cap is disposed at a first distance from the base, and a locked configuration, such that the cap is disposed at a second distance from the base, wherein the first distance is greater than the second distance, and
   wherein the annular rim of the base is configured to extend axially through the central hole when the unitary tree fastener is moved into the locked configuration.

10. The unitary tree fastener of claim 9, wherein the plurality of wings comprises a plurality of first wings and a plurality of second wings, the plurality of first wings being offset longitudinally from the plurality of second wings.

11. The unitary tree fastener of claim 10, wherein the cap is removably secured to the base via at least one locking feature when the unitary tree fastener is in the locked configuration.

12. The unitary tree fastener of claim 11, wherein the at least one locking feature includes at least one first arm that depends from the cap and an annular rim that depends from the base, the at least one first arm being configured to engage with the annular rim when the unitary tree fastener is in the locked configuration.

13. The unitary tree fastener of claim 12, wherein the at least one first arm comprises a plurality of first arms that depend from a lower surface of the cap, the plurality of first arms being disposed in a radial configuration and being separated by a plurality of spaces.

14. The unitary tree fastener of claim 13, wherein, the plurality of first arms are radially disposed about the central hole.

15. The unitary tree fastener of claim 14, wherein the annular rim of the base defines a periphery of a recessed area, and a drive feature is disposed within the recessed area, the drive feature being configured to interface with a working end of a driving tool.

16. A fastener assembly for fastening at least one material to an exterior surface of a first object, wherein the at least one material includes an aperture, and the exterior surface of the first object includes a bore, comprising:

a cap having a first locking feature;
a base having a second locking feature having an annular rim;
a strap connecting the cap with the base;
a stem extending from the base; and
a plurality of wings extending radially outward from the stem,
wherein the fastener assembly is movable between an unlocked configuration, such that the first locking feature is not engaged with the second locking feature, and a locked configuration, such that the first locking feature is engaged with the second locking feature, and
wherein the annular rim defines a periphery of a recessed area, the recessed area including a drive feature therein, the drive feature being configured to engage with a driving tool.

17. The fastener assembly of claim 16, wherein the cap, the base, the strap, and the stem are integrally formed.

18. The fastener assembly of claim 17, wherein the annular rim extends axially upward from a top surface of the base.

19. The fastener assembly of claim 18, wherein when the fastener assembly is in the unlocked configuration, the aperture of the at least one material can be passed over the annular rim of the base, such that subsequently moving the fastener assembly from the unlocked configuration to the locked configuration secures the at least one material between the cap and the base.

20. The fastener assembly of claim 19, wherein the driving tool is configured to install the fastener assembly within the bore of the first object.

* * * * *